United States Patent Office 3,418,350
Patented Dec. 24, 1968

3,418,350
FERROCENE DERIVATIVES OF PHOSPHORUS
Gilbert P. Sollott, Plymouth Meeting, and William R. Peterson, Jr., Levittown, Pa., assignors to the United States of America as represented by the Secretary of the Army
No Drawing. Filed Aug. 18, 1966, Ser. No. 573,761
6 Claims. (Cl. 260—439)

ABSTRACT OF THE DISCLOSURE

Methods for preparing triferrocenylphosphine, diferrocenylphosphinous chloride and ferrocenylphosphonous dichloride which comprises reacting ferrocene with a phosphoramidous dichloride in the presence of aluminum chloride in n-heptane. The resulting compounds have utility as intermediate in forming a variety of phosphorus-containing compounds.

---

This invention relates to ferrocene derivatives of phosphorus and more particularly concerns new methods for preparing triferrocenylphosphine, diferrocenylphosphinous chloride and ferrocenylphosphonous dichloride by aluminum chloride-catalyzed reactions of ferrocene with phosphorus (III) amides.

The structure of ferrocene (FcH), biscyclopentadienyl iron, may be described as a sandwich type having an iron atom between two staggered cyclopentadiene rings:

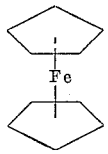

In general, triferrocenylphosphine finds use as a metal extractant and may be used in much the same manner as chelating agents. It has also been found useful in the formation of quaternary salts and metal salt complexes.

Diferrocenylphosphinous chloride and ferrocenylphosphonous dichloride, as well as triferrocenylphosphine, find use in the field of compound snythesis as intermediates in halogenation reactions to form halophosphoranes, in oxidation reactions to form the phosphoryl-containing derivatives, in reactions with sulfur to form sulfur derivatives, etc.

Further, diferrocenylphosphinous chloride and ferrocenylphosphonous dichloride are useful for hydrolysis to oxide and acid respectively, and for oxidative hydrolysis to other acids, in reactions with Grignard or lithium reagents to form tertiary phosphines, and in reduction reactions to produce the secondary and primary phosphines respectively. Moreover, ferrocenylphosphonous dichloride may be used in reactions to form useful and varied polymers.

Triferrocenylphosphine (A) would be expected to form by reactions of the Grignard or lithium reagents of ferrocene with phosphorus trichloride. However, the following disadvantages result:
(1) Low overall yields due to multi-step syntheses.
(2) Tedious and time-consuming syntheses are required to prepare the intermediate metallic derivatives of FcH. This is illustrated by the preparation of lithioferrocene (FcLi):

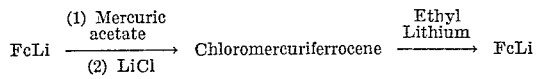

An additional two steps are required for the preparation of the Grignard reagent of FcH from chloromercuriferrocene:

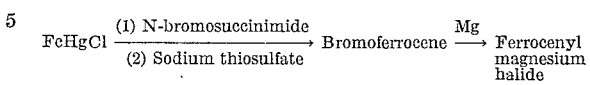

Compound A would also be expected to form by the reduction of triferrocenylphosphine oxide. However, attempted reductions of the oxide by the use of lithium aluminum hydride or sodium metal gave only negative results, while reduction with zinc and hydrochloric acid resulted in isolation of compound A as the hydrochloride, but in poor yield.

Diferrocenylphosphinous chloride (B) and ferrocenylphosphonous dichloride (C), although not isolated as such, are formed in the reaction of ferrocene with phosphorus trichloride in the presence of anhydrous aluminum chloride. Compound (C) may also be produced by the action of an excess of phosphorus trichloride on ferrocenylphosphinic acid.

The above mentioned processes may be used for the preparation of compounds (A), (B), and (C), and are typical of available prior art methods of synthesis.

It is therefore an object of this invention to provide new and improved methods for the production of compounds (A), (B), and (C).

Another object of the invention is to provide methods for the production of compounds (A), (B), and (C), in separate reactions, in substantially good yields requiring essentially but a single step.

Other objects and features of the invention will become apparent as the invention is more fully hereinafter disclosed.

Our invention concerns reactions employing ferrocene, a phosphoramidous dichloride ($R_2NPCl_2$, where $R=CH_3$, $C_2H_5$, $C_6H_5$) and anhydrous aluminum chloride in various molar ratios in refluxing n-heptane under nitrogen for various periods of time. As shown in Table I, infra, compounds (A), (B), and (C), and byproducts thereof, have been obtained in good yields. Reactions for the formation of compounds (A), (B), and (C) may be represented as follows:

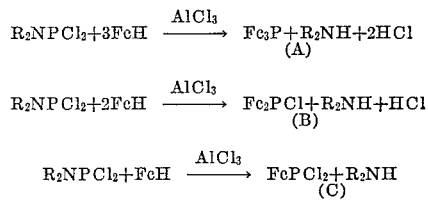

Of various reactants investigated, N,N-dimethylphosphoramidous dichloride was selected for obtaining compounds (B) and (C). The use of n-hexane, n-octane, or ethylene chloride as solvents resulted, for the most part, in lower yields. When the aluminum chloride was substituted for by aluminum bromide, equivalent or greater overall yield resulted, but the tendency for compound (A) to form was increased. This compound may effectively be separated from its oxide (formed during workup of the reaction mixture) by chromatography on activated alumina.

TABLE I
[Reactions of FcH, R₂NPCl₂ and AlCl₃ in n-heptane]

| Run No. | Product of immediate interest | Yield percent | R₂NPCl₂ | Molar ratio FcH: R₂NPCl₂ AlCl₃ | Reflux time, hr. | Solvent volume, ml. | Byproducts and yield |
|---|---|---|---|---|---|---|---|
| 6 | (Fc)₃P (A) | 48 | (C₂H₅)₂NPCl₂ | 3:1:3 | 20 | 350 | (Fc)₃PO (22). |
| 33 | (Fc)₃P (A) | 45 | (CH₃)₂NPCl₂ | 3:1:2 | 1.5 | 350 | (Fc)₃PO (13); (Fc)₂P(O)N(CH₃)₂(7); (Fc)₂P(O)OH (6). |
| 15 | (Fc)₃P (A) | 34 | (C₆H₅)₂NPCl₂ | 2:1:1 | 7 | 350 | (Fc)₂P(O)N(C₆H₅)₂ (18). |
| 35 | (Fc)₂PCl (B) | 27 | (CH₃)₂NPCl₂ | 3:1:1 | 20 | 350 | (Fc)₃P (14); (Fc)₃PO (10); (Fc)₂P(O)H (2). |
| 24 | (Fc)PCl₂ (C) | 23 | (CH₃)₂NPCl₂ | 1:1:1 | 3 | 1050 | (Fc)₃PO (9); (Fc)₂P(O)N(CH₃)₂ (38); (Fc)₂P(O)OH (11). |
| 8 | (Fc)₃PO | 57 | (C₂H₅)₂NPCl₂ | 1:1:1 | 20 | 350 | (Fc)₂P(O)N(C₂H₅)₂ (13); (Fc)₂P(O)OH (14); (Fc)₂PCl (9); (Fc)₂PCl₂ (5). |
| 4 | (Fc)₃PO | 47 | (C₂H₅)₂NPCl₂ | 3:1:2 | 20 | 350 | (Fc)₃P (23). |

It should be noted that although combined yields of the tertiary phosphine and its oxide were reproducible, the ratios of phosphine to phosphine oxide obtained were subject to great variation as a result of hydrolyzing the reaction solids in the presence of air. Hydrolysis under nitrogen helped to minimize formation of the oxide, so that rigid exclusion of air should give all of the tertiary product in the trivalent form. Ratios of phosphine to phosphine oxide thus have no special significance.

Runs No. 6, 33, and 15 illustrate yields of compound A obtainable in addition to byproducts, and employing phosphoramidous dichlorides containing ethyl, methyl, and phenyl, respectively.

A general procedure for the formation of compound (A) and its oxide follows:

A solution of the phosphoramidous dichloride (0.05 mole) in n-heptane (100 ml.) was added dropwise over a period of 30 minutes to ferrocene (0.15 mole) and anhydrous aluminum chloride (0.15 mole) in the same solvent (250 ml.) with stirring under nitrogen. The mixture was refluxed 20 h. with stirring, after which the reddish heptane-insoluble taffy was hydrolyzed in 500 ml. of water, stirring until all solids became light yellow. The solids were extracted with one liter of boiling benzene in portions, and the combined extracts were dried over anhydrous sodium sulfate, reduced to one-half the volume, then chromatographed on a 100-cm. column of activated alumina (80–200 mesh). The phosphine (A) was eluted with benzene, then the phosphine oxide with chloroform. Triferrocenylphosphine has not been characterized for the first time: Fine yellow needles from n-heptane or 95% ethanol, M.P. 271–273° C. (closed capillary). The compound is infusible and decomposes under normal melting procedures. The melting point was observed by immersion of the sample in the heating bath at 270° C. In the above example, the ratio of ferrocene to phosphoramidous dichloride to aluminum chloride is 1:1:1, and each compound may be employed in quantities ranging from about 0.05 to 0.3 mole.

Compound (A) may also be produced in related reactions employing phosphorodiamidous chlorides

[(R₂N)₂PCl where R=CH₃, C₂H₅], and phosphorus triamides

[(R₂N)₃P where R=CH₃, C₂H₅] but in relatively low yield. These reactions, however, do serve to shed light on the mechanism of formation of compounds (A), (B), and (C) and their derivatives from phosphoramidous dichlorides. In accordance therewith, formation of the compounds embodied in our invention may reasonably be explained on the basis that cleavage of the P—N bond involves prior coordination of aluminum chloride to nitrogen, even though coordination to the phosphorus atom might be expected to occur.

Occasionally these reactions produce, upon the usual treatment of the reaction mixtures with water, minor amounts (less than 10%) of diferrocenylphosphine oxide (Run No. 35), which arises from its P (III) tautomer, formed during the hydrolysis step, from compound (B):

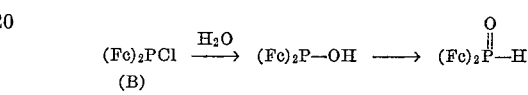

An added feature of this invention, therefore, is the related reaction of ferrocene with phenyl-N,N-diethylphosphonamidous chloride in the presence of anhydrous aluminum chloride to produce the new compound, ferrocenylphenylphosphine oxide, in 52% yield, in addition to 8% of the known compound, diferrocenylphenylphosphine:

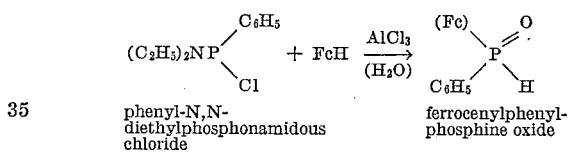

phenyl-N,N-diethylphosphonamidous chloride ferrocenylphenylphosphine oxide

The two above mentioned secondary phosphine oxides are useful for oxidation to acids, and in reduction reactions to produce the secondary phosphines, and generally as intermediates in the synthesis of other useful compounds.

We claim:
1. A method for preparing ferrocene derivatives of P (III) comprising reacting ferrocene with a phosphoramidous dichloride in the presence of an aluminum halide in n-heptane.

2. The method described in claim 1 wherein said ferrocene derivative is selected from the group consisting of triferrocenylphosphine, diferrocenylphosphinous chloride and ferrocenylphosphonous dichloride.

3. The method described in claim 1 wherein said phosphoramidous dichloride is represented by the formula R₂NPCl₂, where R is a radical selected from the group consisting of methyl, ethyl and phenyl.

4. The method described in claim 1 wherein said aluminum halide is selected from the group consisting of aluminum chloride and aluminum bromide.

5. A method of preparing ferrocene derivatives of phosphorous (III) comprising the steps of:
  dissolving about 0.05 to 0.3 mole phosphoramidous dichloride in about 100 ml. of n-heptane to form a solution,
  adding said solution over a period of about 30 minutes to about 0.05 to about 0.30 mole ferrocene and about 0.05 to 0.30 mole anhydrous aluminum chloride in about 250 to 950 ml. of n-heptane while stirring under nitrogen to form a mixture,
  refluxing said mixture about 1.5 to 20 hours to produce a heptane phase and a heptane-insoluble taffy-like product,
  evaporating said heptane phase to produce diferrocenylphosphinous chloride and ferrocenylphosphonous dichloride,
  hydrolyzing said taffy-like product in about 500 ml.

water while stirring until all solids turn light yellow, extracting said yellow solids with boiling benzene, drying said extracted solids and chomotographing said dried solids to obtain said ferrocene derivatives other than diferrocenylphosphinous chloride and ferrocenylphonous dichloride.

6. A compound selected from the group consisting of ferrocenylphenylphosphine oxide and diferrocenylphosphine oxide having the general formula

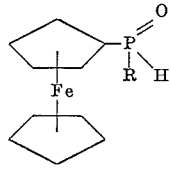

where R is selected from the group consisting of phenyl and ferrocenyl.

References Cited

UNITED STATES PATENTS 3,310,577  3/1967  Sollott _____ 260—439

OTHER REFERENCES

Sollott et al.: J. Org. Chem. 29 (1964), pp. 2451–2.
Sollott et al.: J. Org. Chem. 27 (1962), pp. 4034–40.

TOBIAS B. LEVOW, *Primary Examiner.*

A. P. DEMERS, *Assistant Examiner.*

U.S. Cl. X.R.

260—606.5